Figure 1:
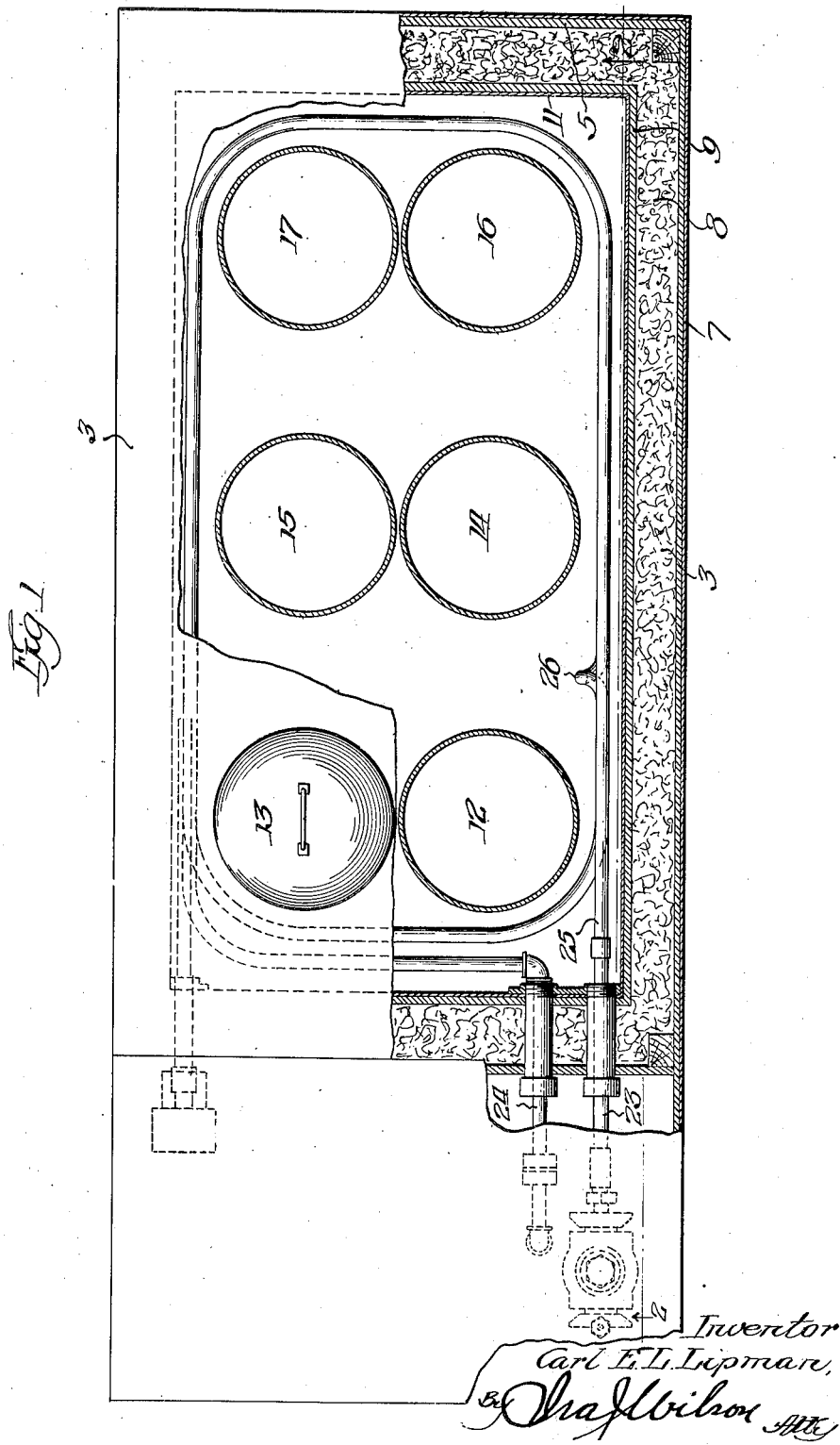

Oct. 19, 1926.

C. E. L. LIPMAN

REFRIGERATING CABINET

Filed Jan. 16, 1924      2 Sheets-Sheet 1

1,603,549

Inventor
Carl E. L. Lipman

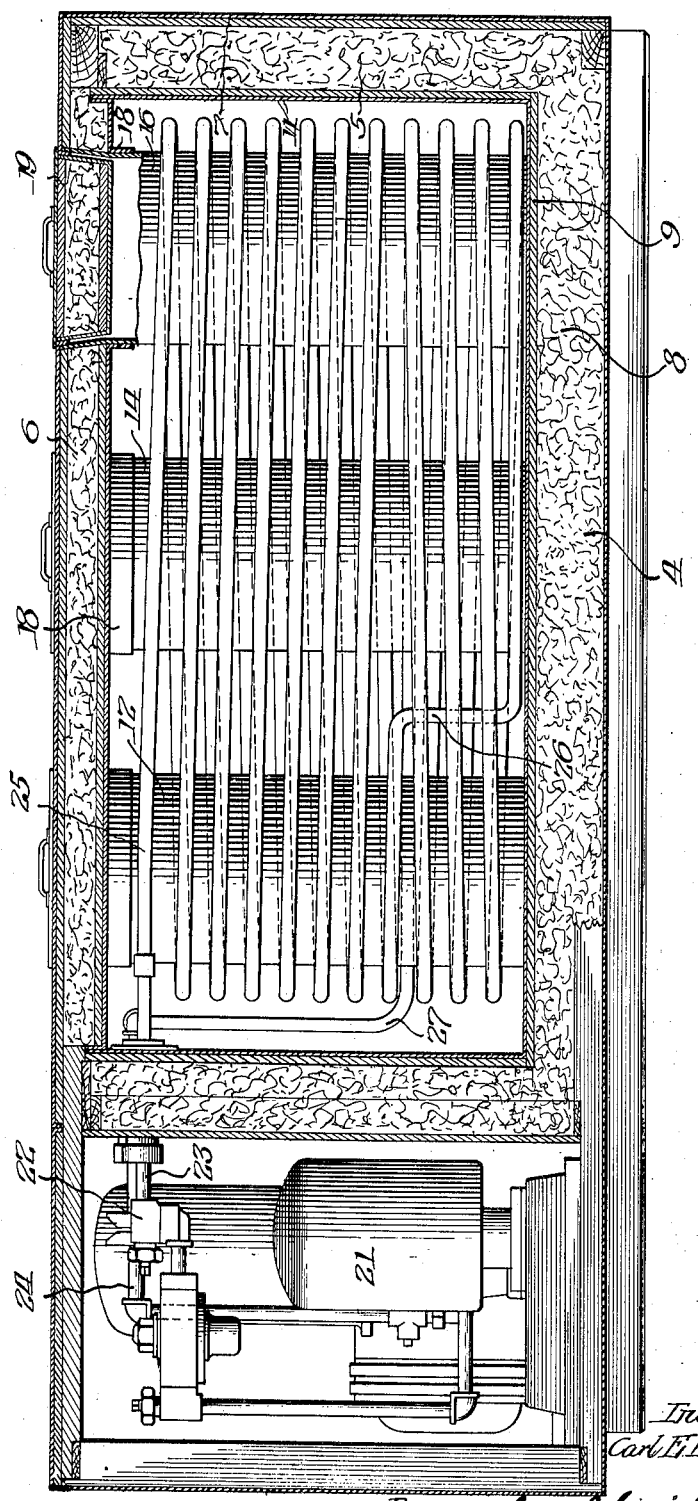

Patented Oct. 19, 1926.

1,603,549

UNITED STATES PATENT OFFICE.

CARL E. L. LIPMAN, OF BELOIT, WISCONSIN, ASSIGNOR TO LIPMAN REFRIGERATION COMPANY, OF BELOIT, WISCONSIN, A CORPORATION OF DELAWARE.

REFRIGERATING CABINET.

Application filed January 16, 1924. Serial No. 686,480.

This invention pertains to storage cabinets in which foodstuffs such as ice cream, for instance, are stored and maintained at a desired low temperature.

Prior to my invention it has been the custom to provide cabinets for the purpose indicated which were constructed to provide a brine tank into which the food containers project. Refrigerating coils connected to a suitable refrigerating machine were disposed within the tank and the refrigerating effect of these coils was exerted upon the food containers through the intermediary of the surrounding brine which customarily was circulated by a suitable pump to maintain a uniformity of temperature within the tank and around the various containers. Such brine containing cabinets, however, possess many disadvantages among which may be mentioned the fact that the cabinet itself was necessarily very heavily constructed in order to hold a large quantity of this heavy brine, the interior walls of the cabinet were subject to the corrosive effect of the contained brine which sooner or later resulted in leakage of the brine from the cabinet, the employment of a brine circulating pump increased not only the manufacturing and installation costs, but also the cost of operation, and in addition the initial charging and the subsequent replacement of the tank with brine added to the labor and expense of maintaining the cabinet in practical operation.

One of the primary purposes of my present invention is to eliminate all of the aforementioned and other objections to the use of brine cooled cabinets by entirely eliminating the brine, the circulating pump and the other expensive features necessitated by the use of brine, and with this end in view my invention contemplates the provisions of a cabinet which is cooled by direct expansion in the cooling coils, the heat units being transferred from the food containers to the coils by conduction and convectional action of the air in the cooling chamber surrounding the food containers.

Another purpose of the invention is to distribute the refrigerating effect of the expansion coils with respect to the food containers so that the containers may be maintained at the desired temperature from top to bottom. In order to secure this result the coils are so arranged and disposed relatively to the containers that their refrigerating effect is distributed, and having in mind at the same time the convectional action of the air surrounding the coils and the containers, the ultimate result is the maintenance of the containers at the desired temperature.

In order to facilitate an understanding of my invention I have illustrated on the accompanying drawings a preferred embodiment thereof.

Referring to the drawings:

Fig. 1 is a plan view partially in section of a cabinet embodying my invention; and Fig. 2 is a sectional view on the line 2—2 of Fig. 1.

Referring now to the drawings more in detail, it will be observed that the cabinet proper comprises side walls 3, bottom 4, end walls 5, and a top 6, all comprising in their construction heat insulating material so as to provide a heat insulated chamber in which the food containers are disposed. While the structure of the walls of the cabinet may be widely varied, they preferably comprise a metal outer wall 7, lined with corkboard, or other suitable heat insulating material 8, over the inner surface of which is laid a layer of asphalt 9, the whole construction being lined with a metal lining 11.

A plurality of open-top food containers are disposed within the chamber thus formed, six of such containers being shown in the present drawing for illustrative purposes and indicated by reference characters 12, 13, 14, 15, 16 and 17, respectively. Each of the containers is preferably formed of metal and the interior thereof is sealed against communication with the surrounding cooling chamber by a suitable sealing sleeve 18. A removable cover 19 also formed of heat insulating material is adapted to close the top of each container.

The refrigerating work performed upon the containers may be produced by any suitable refrigerating machine, and in the present instance I have shown for illustrative purposes merely a conventional machine which is indicated generally by reference character 21, the machine being of the compression type and having a regulatable expansion valve 22 interposed in the expansion pipe 23 of the circuit, the suction pipe 24, leading from the expansion coils, being connected with the intake side of the compressor in the usual manner. This refrigerating machine may be mounted in any convenient location remote from or in proximity to the cooling chamber, but for convenience it is preferably installed in a compartment provided at one end of the cooling chamber as shown in the drawings, particularly Fig. 2 thereof.

The cooling chamber in which the containers are disposed is for all practical purposes hermetically sealed and the space within the chamber surrounding the containers is filled with air only, no liquid refrigerating medium such as brine or other solutions possessing the undesirable characteristics above enumerated being employed. The expansion coils of the refrigerating system which serve as the cooling coils for the containers are disposed in this chamber around the containers, and while these coils are not in contact with the containers, the arrangement of the coils in the substantially hermetically sealed chamber, together with the conduction and convectional properties of the air in the chamber, serve to cool the containers and maintain them at the desired temperature. The refrigerative work exerted by the coils may of course be regulated by controlling the operation of the refrigerating machine and preferably the cooling chamber is provided with a thermostat equipped to automatically control the machine so as to maintain a predetermined temperature within the chamber.

The pipe 23 leading from the expansion valve 22 connects inside the cooling chamber with the first convolution 25 of the cooling coil. The coil is arranged in convolutions around the containers as illustrated in Fig. 1, the first convolution being at the top of the coil. Instead, however, of winding the coil entirely from top to bottom, I found that a greater uniformity of temperature of the containers may be maintained by winding the coil from the top downwardly for a portion of the height of the containers, whereupon the pipe from which the coil is formed is extended downwardly as indicated at 26 (Fig. 2) to the bottom of the chamber. From this point the coil is then wound in upwardly extending convolutions until it meets the previously wound downwardly extending convolutions, whereupon the pipe is extended directly upwardly as indicated at 27, its upper end being returned through the end wall of the chamber and connected with the suction pipe 24.

It will be seen that I have provided a refrigerating cabinet from which all brine or other solutions are eliminated. The cabinet can therefore be manufactured more economically than a brine tank type. The brine itself and the circulating pumps are dispensed with, thus resulting in a lighter, cheaper, and more sanitary cabinet than the brine cabinets heretofore employed. The expansion coils of the refrigerative system are disposed directly in a closed cooling chamber in which the food containers are disposed; the containers and the expansion coils are surrounded by air only which is capable of heat extraction from the containers by direct conduction to a limited extent. This heat transference by conduction is further augmented, however, by the convectional action of the air produced by differentials of temperature between the coils and the exterior walls of the containers. Currents are set up which rapidly transfer the heat units from the containers to the coils from which the units are removed by the circulating refrigerating medium therein. By winding the coils from the top downwardly for a predetermined distance the greatest cooling effect is produced first near the top of the containers. In the present case, if the coils were wound continuously from the top to the bottom of the containers, a certain amount of the refrigerating vapor would, when the machine is intermittently stopped, condense in the tubes and repose in the lowermost coils of the winding. When the refrigerating machine 21 commenced to operate again, a certain amount of the liquid might be drawn upward through the pipe 27 as a slug of liquid into the compressor with very injurious results thereto. In any event, even if liquid was not drawn upward through the return pipe 27, a vacuum would be created in said pipe upon the operation of the machine 21, and the vaporized refrigerant would only tend to reduce the temperature in the region of said pipe and not in the lower coils around the containers.

By winding the coils in the manner shown and described in this application, the condensed refrigerating vapor will lie in the lowermost coil and when the machine 21 is started, a vacuum will be created in the pipe 27 which will vaporize the condensed refrigerant and perform refrigerating work in the successive coils, thereby decreasing the temperature around the lower part of the containers. This method of winding will therefore tend toward uniformity of temperature of the containers throughout their depth and also preclude injury to the compressor, as the refrigerant which has been condensed in the coils will be returned to the compressor in vapor form.

I have discovered that the best results are accomplished when the downward winding is continued throughout a portion of the height of the containers, whereupon the pipe is extended to the bottom of the chamber and then wound upwardly for a limited distance. This winding of the coil in two directions about the containers not only tends toward uniformity of temperature of the containers throughout their depth from direct conduction, but is also conducive toward and facilitates the desired convectional air currents established in the chamber. A high degree of efficiency is accordingly secured which enables the maintenance of the containers at a desired refrigerated temperature in a dry, sanitary cabinet which is extremely economical to manufacture, install and operate. The structural details illustrated and described may obviously be varied within considerable limits without exceeding the scope of the invention as defined in the following claims.

I claim:

1. A refrigerating cabinet comprising a closed air filled chamber, an open-top container extending into said chamber, and an expansion coil of a refrigerating system surrounding said container within the chamber, said coil being wound from the top of the container downwardly throughout a portion of its length and then wound from the bottom of the container upwardly throughout the remainder of its length.

2. A refrigerating cabinet comprising a closed substantially hermetically sealed air chamber having heat insulating walls, a plurality of containers extending into said chamber and accessible from outside the cabinet, and a direct expansion cooling coil arranged within said chamber around said containers and spaced therefrom, said coil being wound downwardly throughout a portion of its length and upwardly throughout the remainder of its length.

3. A refrigerating cabinet comprising a cooling chamber having heat insulating walls, a plurality of open-top containers extending downwardly into said chamber, said chamber being substantially hermetically sealed around said containers, and a direct expansion cooling coil disposed within said chamber around the containers, said coil being wound from the top downwardly to a point spaced from the bottom of the chamber, then extended directly downwardly to said bottom and then wound upwardly around the containers throughout the remainder of its length.

CARL E. L. LIPMAN.